(12) United States Patent
Nishimura et al.

(10) Patent No.: US 10,903,475 B2
(45) Date of Patent: Jan. 26, 2021

(54) ENERGY STORAGE APPARATUS

(71) Applicants: GS Yuasa International Ltd., Kyoto (JP); Honda Motor Co., Ltd., Tokyo (JP)

(72) Inventors: Yosuke Nishimura, Kyoto (JP); Yuta Yamamoto, Kyoto (JP); Kentaro Yamada, Tokyo (JP)

(73) Assignees: GS YUASA INTERNATIONAL LTD., Kyoto (JP); HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 16/053,633

(22) Filed: Aug. 2, 2018

(65) Prior Publication Data

US 2019/0044123 A1 Feb. 7, 2019

(30) Foreign Application Priority Data

Aug. 3, 2017 (JP) ................. 2017-150766

(51) Int. Cl.
*H01M 2/34* (2006.01)
*H01M 2/10* (2006.01)
(Continued)

(52) U.S. Cl.
CPC ........... *H01M 2/34* (2013.01); *H01M 2/1077* (2013.01); *H01M 2/1083* (2013.01);
(Continued)

(58) Field of Classification Search
CPC ....... H01M 2200/103; H01M 2220/20; H01M 2/1077; H01M 2/1083; H01M 2/206; H01M 2/22; H01M 2/34
See application file for complete search history.

(56) References Cited

U.S. PATENT DOCUMENTS

2007/0099073 A1* 5/2007 White ................. H01M 2/1055
429/158
2009/0159311 A1 6/2009 Zheng et al.
(Continued)

FOREIGN PATENT DOCUMENTS

JP 2006-318676 A 11/2006
JP 2011-091035 A 5/2011
(Continued)

OTHER PUBLICATIONS

Machine Translation JP2013073929(A) (Year: 2013).*

*Primary Examiner* — Victoria H Lynch
(74) *Attorney, Agent, or Firm* — McGinn I.P. Law Group, PLLC.

(57) ABSTRACT

An energy storage apparatus includes: energy storage devices each including an external terminal, the energy storage devices being arranged in a first direction; a bus bar including a plate-like conductive portion; and a neighboring member disposed between the energy storage devices. The conductive portion includes: a fusible portion where a width size, which is a size in a second direction orthogonal to the first direction, is defined by a pair of edges, the width size being smaller than a width size of other portions of the conductive portion; and a pair of enlarged width portions contiguously formed with both sides of the fusible portion in the first direction, a width size of the pair of enlarged width portions increasing in a direction away from the fusible portion. The fusible portion is disposed at a position where the fusible portion overlaps with the neighboring member, and a size of the neighboring member in the first direction is equal to or more than a size of the fusible portion in the first direction.

20 Claims, 10 Drawing Sheets

(51) Int. Cl.
  *H01M 2/20* (2006.01)
  *H01M 2/22* (2006.01)
(52) U.S. Cl.
  CPC ............ *H01M 2/206* (2013.01); *H01M 2/22* (2013.01); *H01M 2200/103* (2013.01); *H01M 2220/20* (2013.01)

(56) References Cited

U.S. PATENT DOCUMENTS

| | | | |
|---|---|---|---|
| 2011/0039147 A1* | 2/2011 | Cheon | H01M 10/42 429/159 |
| 2011/0097620 A1 | 4/2011 | Kim | |
| 2011/0256445 A1 | 10/2011 | Kim et al. | |
| 2012/0212232 A1 | 8/2012 | Ikeda et al. | |
| 2014/0335393 A1* | 11/2014 | Wada | H01M 2/1077 429/121 |
| 2015/0171413 A1 | 6/2015 | Schweinbenz et al. | |
| 2016/0293930 A1* | 10/2016 | Guen | H01M 2/345 |
| 2017/0033332 A1 | 2/2017 | Sakai et al. | |

FOREIGN PATENT DOCUMENTS

| | | |
|---|---|---|
| JP | 2011-228302 A | 11/2011 |
| JP | 2013-073929 A | 4/2013 |
| JP | 2013-254739 A | 12/2013 |
| JP | 2015-515096 A | 5/2015 |
| JP | 2015-207442 A | 11/2015 |
| JP | 2016-197521 A | 11/2016 |
| WO | WO 2011/052699 A | 5/2011 |

* cited by examiner

ENERGY STORAGE APPARATUS

CROSS-REFERENCE TO RELATED APPLICATIONS

This application claims the benefit of Japanese patent application No. 2017-150766 filed on Aug. 3, 2017, which is incorporated by reference.

FIELD

The present invention relates to an energy storage apparatus.

BACKGROUND

Conventionally, as shown in FIG. 12, there has been known an energy storage module 100 where a plurality of secondary batteries 101 are connected to each other by bus bars 106 (see JP 2016-197521 A).

The secondary battery 101 includes a case 102, and an electrode assembly is housed in the case 102. The electrode assembly has a stacked structure where positive electrodes and negative electrodes are stacked in layers with an insulating separator interposed between the positive electrode and the negative electrode. The secondary battery 101 also includes a positive electrode terminal structure 103 and a negative electrode terminal structure 104 which perform transaction (acceptance and reception) of electricity with the electrode assembly. These positive electrode terminal structure 103 and negative electrode terminal structure 104 respectively include an external connection terminal 105 disposed outside the case 102. A bus bar 106 can be fixed to the external connection terminal 105 outside the case 102, and the bus bar 106 connects the external connection terminals 105 of the secondary batteries 101 disposed adjacently to each other by such fixing.

In the above-mentioned energy storage module 100, when an overcurrent flows in the energy storage module 100, temperatures of the positive electrode terminal structure 103 and the negative electrode terminal structure 104 are increased. Therefore, gas tightness of members (gaskets or the like), which ensure gas tightness between these positive electrode terminal structure 103 and negative electrode terminal structure 104 and the case 102, may be lowered.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been made in view of the above-mentioned circumstances. It is an object of the present invention to provide an energy storage apparatus capable of suppressing the increase of a temperature of an external terminal caused by an overcurrent when the overcurrent flows in the energy storage apparatus.

According to an aspect of the present invention, there is provided an energy storage apparatus which includes: a plurality of energy storage devices each including an external terminal, the plurality of energy storage devices arranged in a first direction; a bus bar including a plate-like conductive portion which electrically connects the external terminals of the different energy storage devices with each other; and a neighboring member disposed between the energy storage devices where the external terminals are connected to each other by the bus bar. The conductive portion includes: a fusible portion where a width size, which is a size in a second direction orthogonal to the first direction, is defined by a pair of edges, the width size being smaller than a width size of other portions of the conductive portion; and a pair of enlarged width portion contiguously formed with both sides of the fusible portion in the first direction, a width side of the pair of enlarged width portions increasing in a direction away from the fusible portion. The fusible portion is disposed at a position where the fusible portion overlaps with the neighboring member, and a size of the neighboring member in the first direction is equal to or more than a size of the fusible portion in the first direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
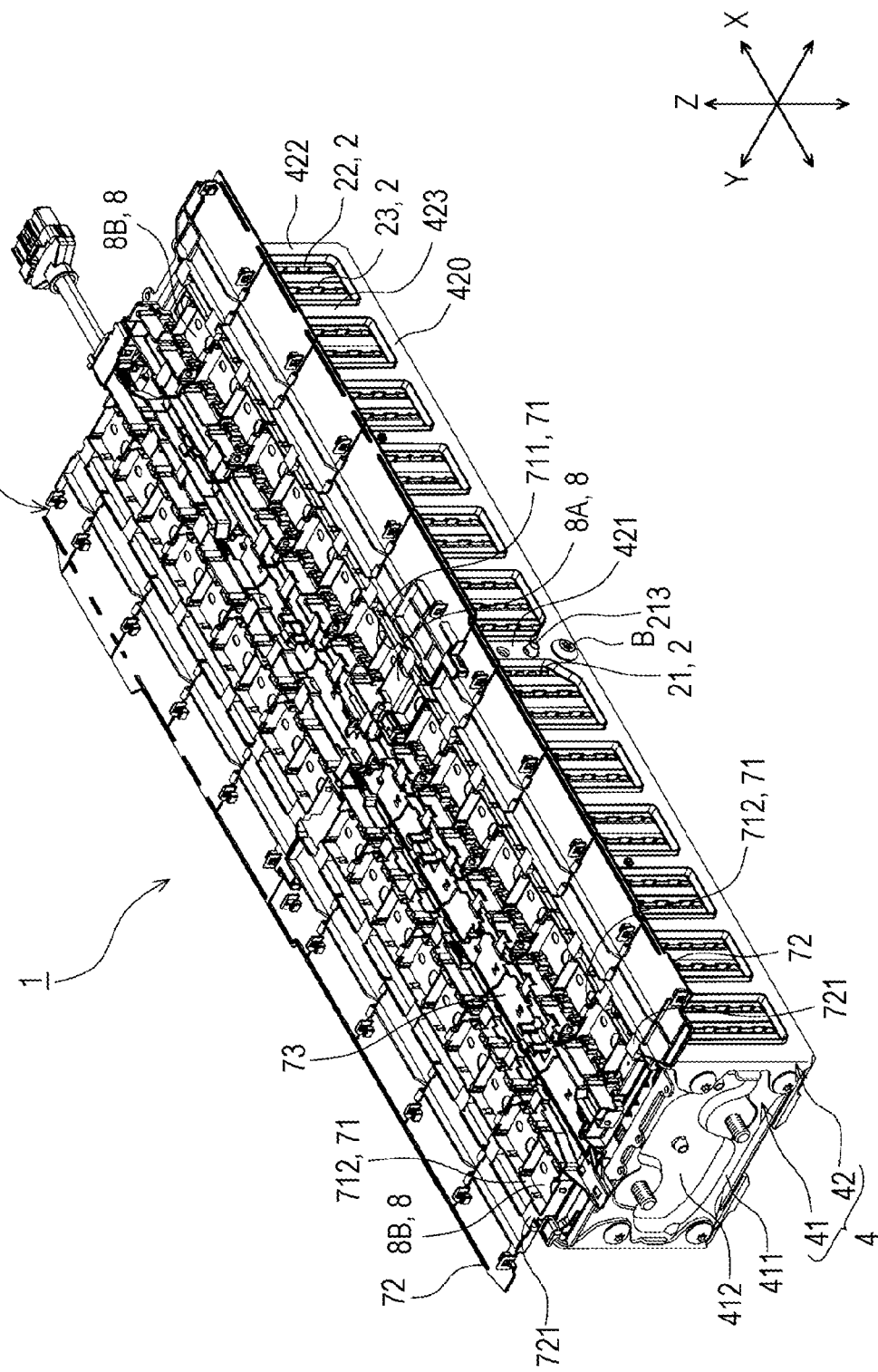
FIG. 1 is a perspective view of an energy storage apparatus according to a first embodiment.

According to an aspect of the present invention, there is provided an energy storage apparatus which includes: a plurality of energy storage devices each including an external terminal, the plurality of energy storage devices arranged in a first direction; a bus bar including a plate-like conductive portion which electrically connects the external terminals of the different energy storage devices with each other; and a neighboring member disposed between the energy storage devices where the external terminals are connected to each other by the bus bar. The conductive portion includes: a fusible portion where a width size which is a size in a second direction orthogonal to the first direction is defined by a pair of edges, the width size being smaller than a width size of other portions of the conductive portion; and a pair of enlarged width portion contiguously formed with both sides of the fusible portion in the first direction, a width side of the pair of enlarged width portions increasing in a direction away from the fusible portion. The fusible portion is disposed at a position where the fusible portion overlaps with the neighboring member, and a size of the neighboring member in the first direction is equal to or more than a size of the fusible portion in the first direction.

By forming the enlarged width portion where the width size increases on both sides of the fusible portion, heat generated in the fusible portion is liable to be accumulated in the fusible portion and, further, when heat is transferred to the enlarged width portion, heat is diffused (heat being easily leaked). Therefore, when heat is generated in the conductive portion, heat is accumulated in the fusible portion so that a temperature of the fusible portion is sufficiently increased and a temperature of the enlarged width portion is sufficiently low compared to a temperature of the fusible portion. Accordingly, when a temperature of the bus bar is increased along with the flow of an overcurrent, the fusible portion which becomes a high temperature is quickly fused so that a path in the energy storage apparatus through which an overcurrent flows is rapidly interrupted. As a result, the increase of a temperature of the external terminal caused by an overcurrent can be suitably suppressed.

In the energy storage apparatus, the conductive portion may include a pair of stress relaxing portions which is contiguously formed with outer sides of the pair of enlarged width portions in the first direction, and has a width size increased in a direction away from the enlarged width portion. A pair of edges of the conductive portion in a width direction may be bent at a boundary position between the enlarged width portion and the stress relaxing portion.

By forming the stress relaxing portion and the enlarged width portion between a portion (fixing portion) of the conductive portion fixed to the external terminal and the fusible portion, and by decreasing the width size of the conductive portion through the stress relaxing portion and the enlarged width portion (gradually decreasing the width size), it is possible to suppress stress concentration between the fixing portion and the fusible portion of the conductive portion compared to a case where the width size is sharply decreased only through the enlarged width portion by forming only the enlarged width portion between the fixing portion and the fusible portion.

Further, the pair of edges of the conductive portion may be bent at the boundary position between the stress relaxing portion and the enlarged width portion. That is, by changing a degree of width enlargement, the transfer of heat (degree of leakage of heat) from the fusible portion to a fixing portion or magnitude of a stress at respective positions (distribution of stress) can be easily adjusted. That is, by setting the enlargement of width with consideration for the diffusion (easiness of leakage) of heat in the enlarged width portion and the prevention of stress concentration in the stress relaxing portion, a degree of leakage of heat and the distribution of stress can be easily adjusted.

The energy storage apparatus may include a member which surrounds a periphery of the bus bar.

With such a configuration, it is possible to prevent falling of the melted bus bar on the energy storage device with more certainty.

In the energy storage apparatus, the energy storage device may include an electrode assembly, and a current collector which connects the electrode assembly and the external terminal to each other. A size of the fusible portion in the first direction and the width size of the fusible portion may be set to sizes which allow fusing of the fusible portion earlier than the current collector when an overcurrent flows in the energy storage apparatus.

With such a configuration, by fusing the bus bar earlier than the current collector in a situation where temperatures of respective portions of the energy storage apparatus are increased with the flowing of an overcurrent in the energy storage apparatus, fusing of the current collector, that is, a damage to the energy storage device per se can be prevented.

In the energy storage apparatus, the pair of respective edges of the fusible portion may extend in a straight line shape in the first direction.

When the pair of respective edges of the fusible portion straightly extends in a first direction (that is, the edges extending parallel to each other), compared to a fusible portion (bus bar) where a width size is increased in a direction toward an outside from a center portion in a first direction, heat generated at a center portion of the fusible portion in the first direction minimally leaks to an enlarged width portion side and hence, heat is liable to be accumulated in the fusible portion. Accordingly, when an overcurrent flows in the bus bar, the fusible portion is fused more quickly so that a path through which the overcurrent flows can be interrupted more rapidly.

According to another aspect of the present invention, there is provided a movable object which includes: any one of the above-mentioned energy storage apparatuses; a movable object body on which the energy storage apparatus is mounted; and a drive part which drives the movable object body using electricity supplied from the energy storage apparatus. The energy storage apparatus is disposed such that the neighboring member is positioned below the fusible portion of the bus bar.

With such a configuration, in the energy storage apparatus mounted on the movable object, when an overcurrent flows in the energy storage apparatus so that a temperature of the bus bar is increased, the fusible portion which becomes a high temperature is quickly fused so that a path in the energy storage apparatus through which an overcurrent flows is rapidly interrupted. As a result, the increase of a temperature of the external terminal caused by an overcurrent can be suitably suppressed.

According to still another aspect of the present invention, there is provided an energy storage system which includes: any one of the above-mentioned energy storage apparatuses; an energy storage system body on which the energy storage apparatus is mounted; and an input/output terminal connected to the energy storage apparatus and allowing inputting of electricity to the energy storage apparatus from an outside and outputting of electricity from the energy storage apparatus to the outside. The energy storage apparatus is disposed such that the neighboring member is positioned below the fusible portion of the bus bar.

With such a configuration, in the energy storage apparatus mounted on the energy storage system, when an overcurrent flows in the energy storage apparatus so that a temperature of the bus bar is increased, the fusible portion which becomes a high temperature is quickly fused so that a path in the energy storage apparatus through which an overcurrent flows is rapidly interrupted. As a result, the increase of a temperature of the external terminal caused by an overcurrent can be suitably suppressed.

As has been described above, the present invention can provide an energy storage apparatus where it is possible to suppress the increase of a temperature of an external terminal caused by an overcurrent when the overcurrent flows in the energy storage apparatus.

Hereinafter, a first embodiment of the present invention is described with reference to FIG. 1 to FIG. 9. Names of respective constitutional members (respective constitutional elements) according to this embodiment are specific for this embodiment, and may differ from names of respective constitutional members (respective constitutional elements) in

BACKGROUND

As shown in FIG. 1 to FIG. 4, the energy storage apparatus includes: a plurality of energy storage devices 10 each having external terminals 14; and bus bars 8 for connecting the external terminals 14 of the different energy storage devices 10 to each other in a conductive manner. The energy storage apparatus 1 includes: a plurality of neighboring members 2 each of which is disposed adjacently to the energy storage device 10; a holder 4 which holds the plurality of energy storage devices 10 and the plurality of neighboring members 2 collectively; and insulators 6 each of which is disposed between the plurality of energy storage device 10 and the holder 4. The energy storage apparatus 1 of this embodiment includes a member which surrounds the bus bars 8, to be more specific, a cover member 7 which holds the bus bars 8 and expands along portions of the energy storage devices 10 where the external terminals are disposed.

The plurality of energy storage devices 10 are arranged in a predetermined direction (X axis direction). Each of the plurality of energy storage devices 10 is a primary battery, a secondary battery, a capacitor or the like. The energy storage device 10 of this embodiment is a nonaqueous electrolyte secondary battery which can charge electricity and discharge electricity. To be more specific, the energy storage device 10 is a lithium ion secondary battery which makes use of electron transfer generated along with transfer of lithium ions.

Figure 5:
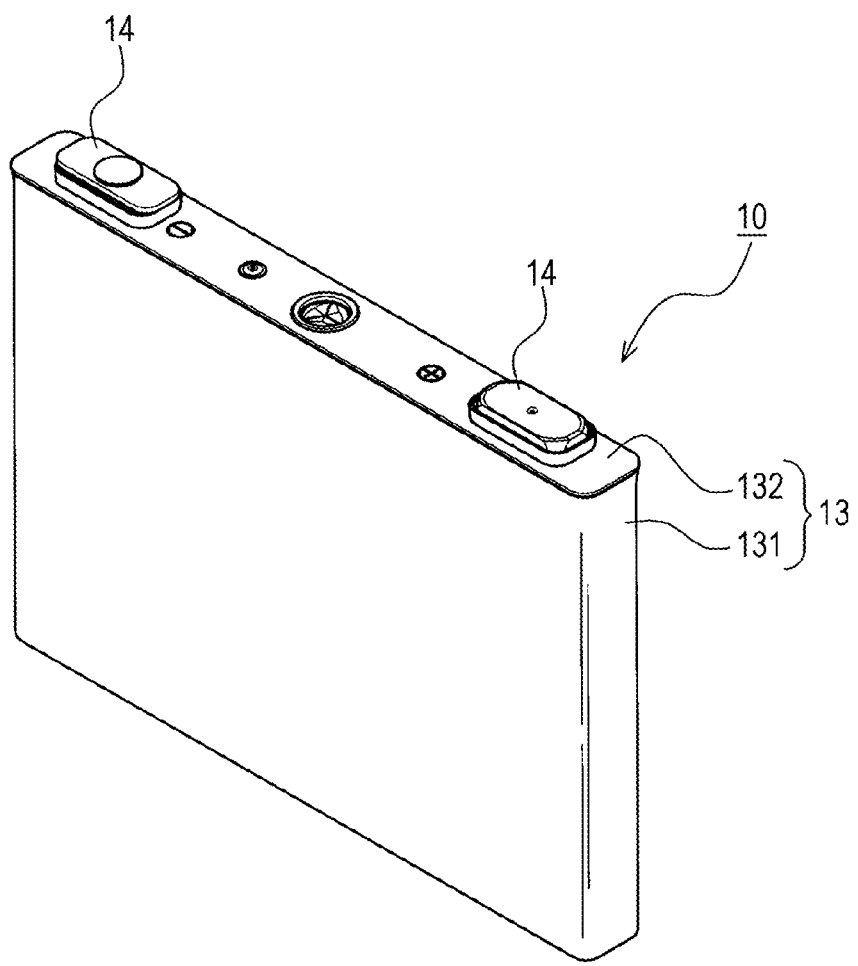
FIG. 5 is a perspective view of an energy storage device which the energy storage apparatus includes.
Figure 6:
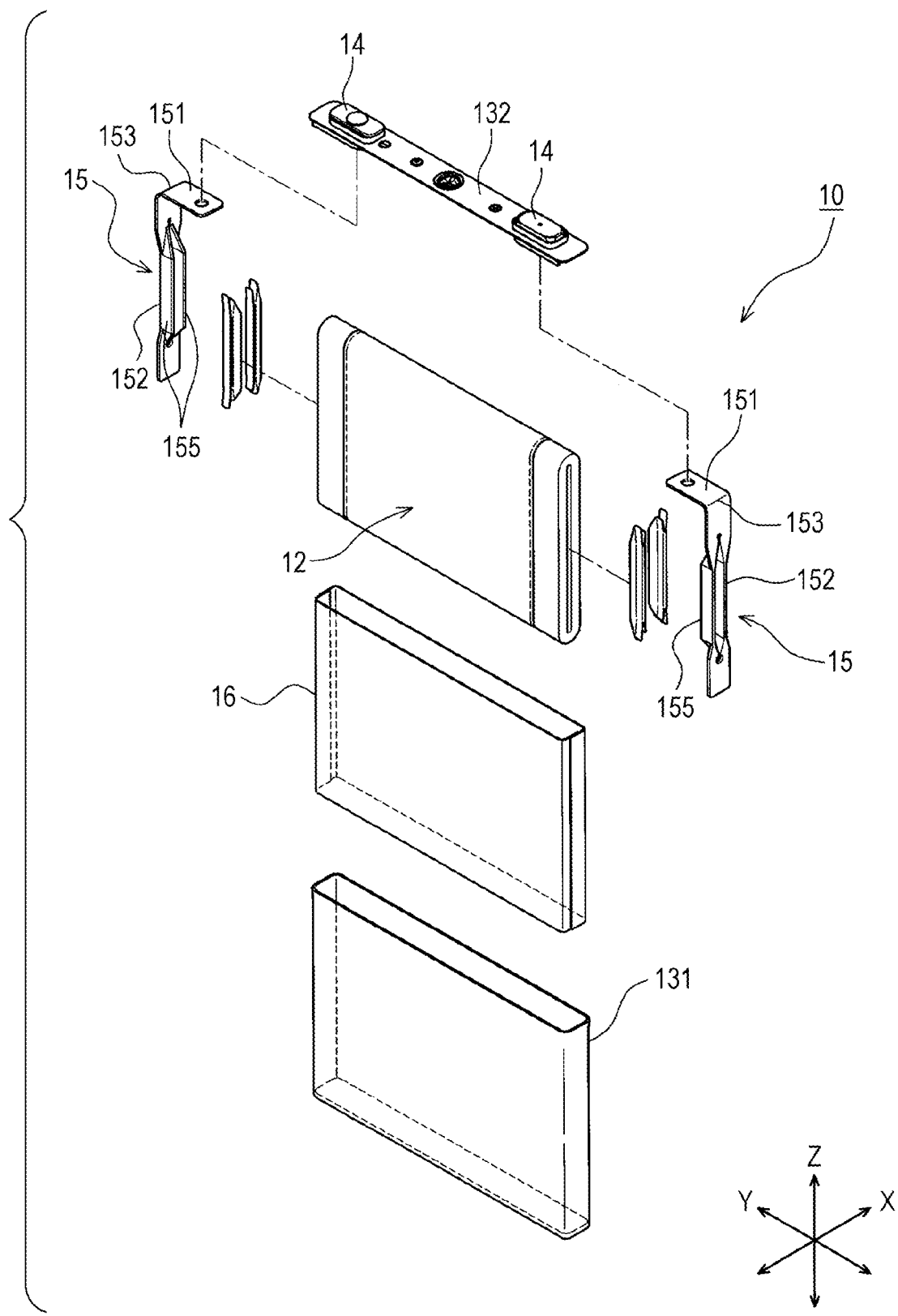
FIG. 6 is an exploded perspective view of the energy storage device.

As shown in FIG. 5 and FIG. 6, the energy storage device 10 includes: an electrode assembly 12; a case 13 which houses the electrode assembly 12 and an electrolyte solution; the external terminals 14 with at least a portion of each external terminal 14 exposed to the outside of the case 13; current collectors 15 which connect the electrode assembly 12 and the external terminals 14 to each other; and a case inner insulator 16 which is disposed between the electrode assembly 12 and the case 13.

In the electrode assembly 12, positive electrodes and negative electrodes are alternately stacked to each other with a separator interposed between the positive electrode and the negative electrode. The electrode assembly 12 of this embodiment is a so-called winding-type electrode assembly where elongated positive electrodes, elongated negative electrodes, and elongated separators are wound in a state where the positive electrodes and the negative electrodes are alternately stacked to each other with the separator interposed between the positive electrode and the negative electrode. In this electrode assembly 12, due to transfer of lithium ions between the positive electrode and the negative electrode, the energy storage device 10 can charge electricity and discharge electricity.

The case 13 has a case body 131 having an opening, and a plate-like lid plate 132 which shuts (closes) the opening of the case body 131. The case body 131 of this embodiment has a bottomed rectangular cylindrical shape, and the case 13 has a rectangular parallelepiped shape (shape having six surfaces). In this embodiment, the case 13 has a flat rectangular parallelepiped shape, and the plurality of energy storage devices 10 are arranged in the X axis direction in a state where enlarged width surfaces (wall portions) of the cases 13 (case bodies 131) oppositely face each other.

The current collector 15 includes: a first connecting portion 151 which is connected to the external terminal 14 in a conductive manner; a second connecting portion 152 which is connected to the electrode assembly 12 in a conductive manner; and a bent portion 153 which connects the first connecting portion 151 and the second connecting portion 152 to each other. In the current collector 15, the bent portion 153 is disposed in the vicinity of a boundary between the lid plate 132 and the case body 131 in the case 13, the first connecting portion 151 extends from the bent portion 153 along the lid plate 132, and the second connecting portion 152 extends from the bent portion 153 along the case body 131. With respect to a portion of the second connecting portion 152 where fusing is most likely to occur when a large electric current flows, a size (a cross-sectional area, a width, a thickness or the like), a material, a resistance value or the like of such a portion is set such that fusing of the portion does not occur earlier than fusing of the bus bar 8 even when an overcurrent having a magnitude which brings about fusing of the predetermined bus bar 8 (first bus bar 8A described later) flows in the energy storage apparatus 1.

Hereinafter, a direction that the plurality of energy storage devices 10 are arranged is assumed as an X axis in an orthogonal coordinate system, a direction that the pair of narrow-width surfaces (wall portions) of the case body 131 oppositely face each other is assumed as a Y axis in the orthogonal coordinate system, and a normal direction of the lid plate 132 is assumed as a Z axis in the orthogonal coordinate system.

Figure 2:
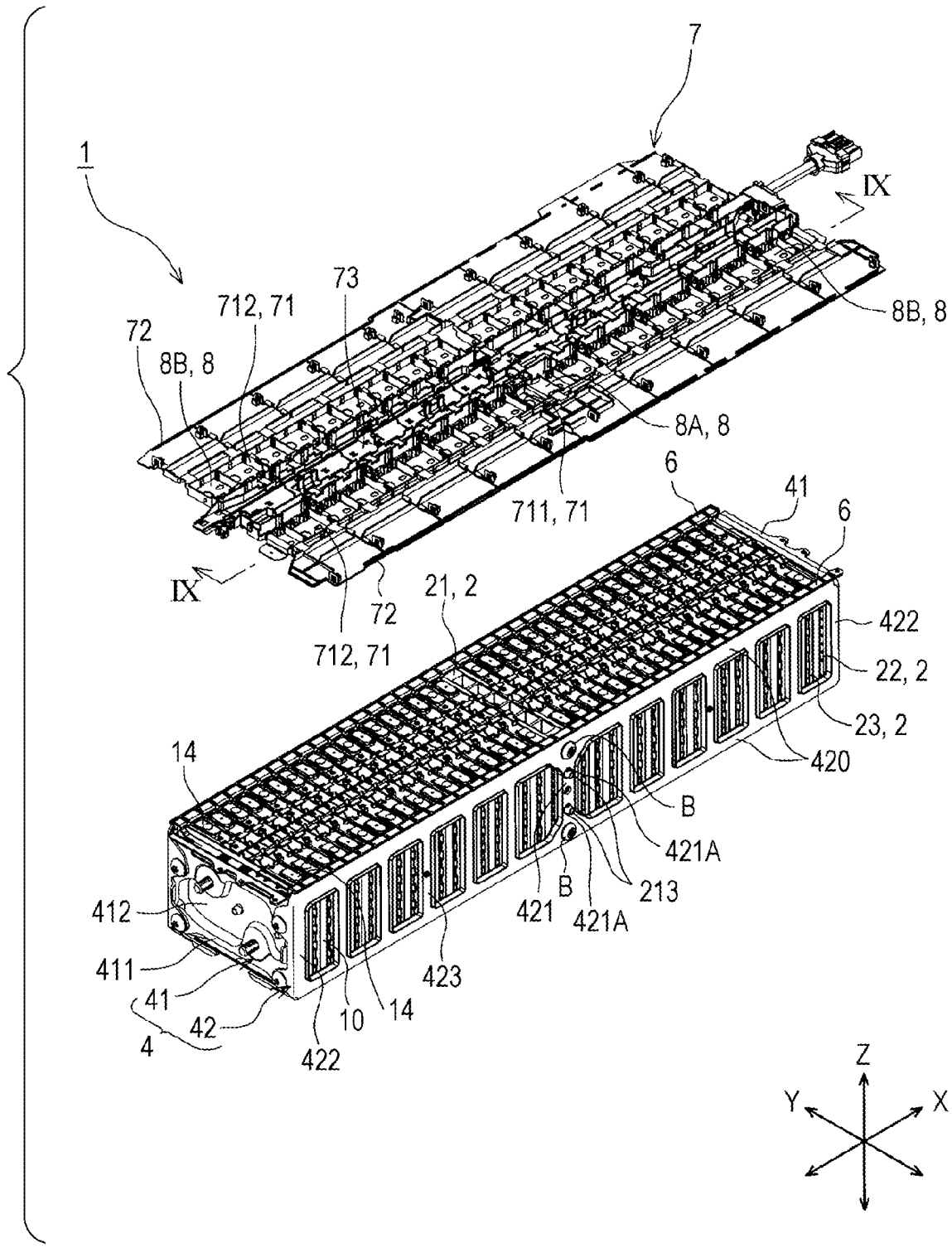
FIG. 2 is a perspective view of the energy storage apparatus in a state where a cover member which holes bus bars is separated from the energy storage apparatus.
Figure 4:
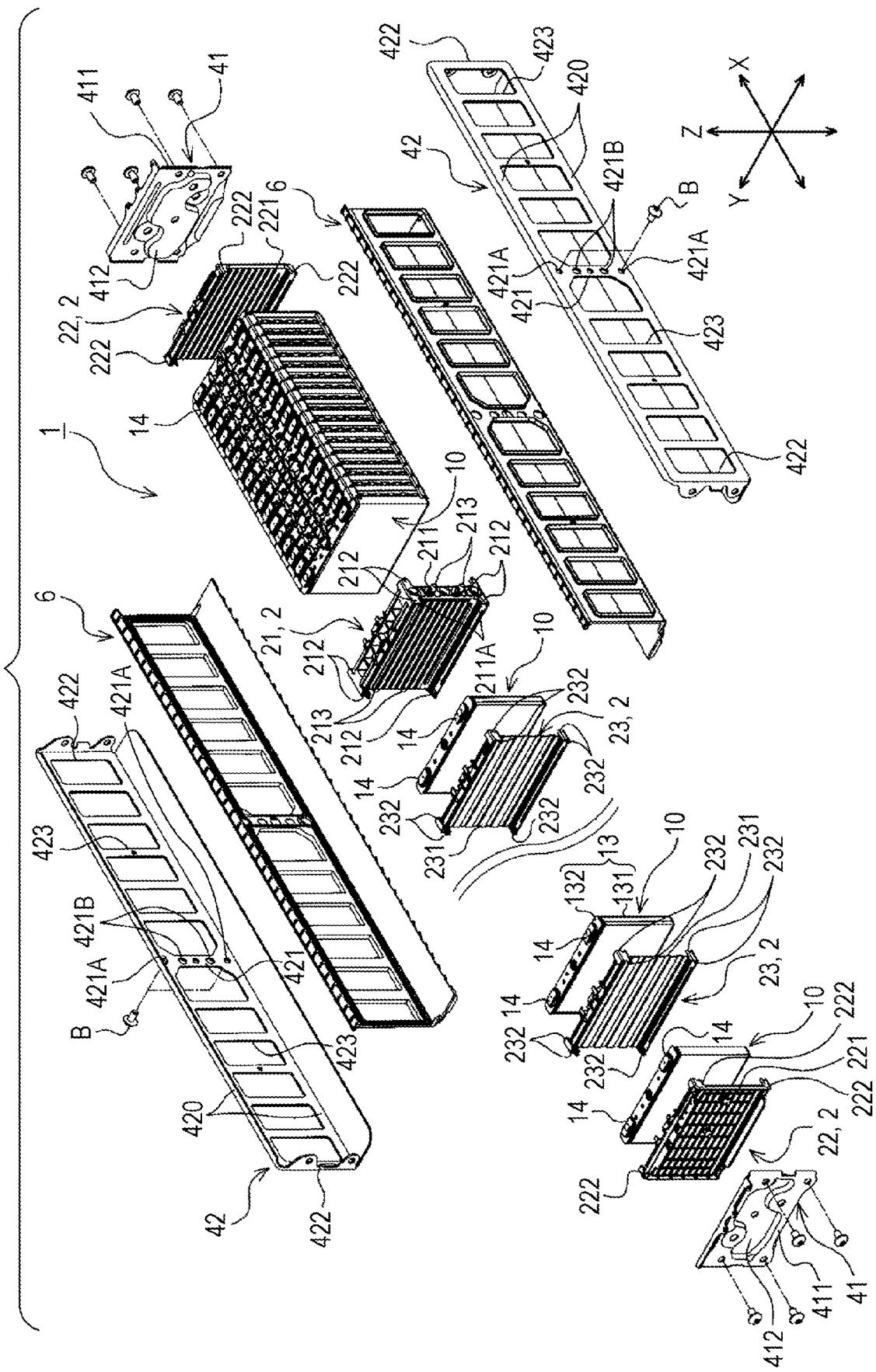
FIG. 4 is an exploded perspective view of the energy storage apparatus in a state where the bus bars and the cover member are removed from the energy storage apparatus.

As shown in FIG. 1, FIG. 2, and FIG. 4, each neighboring member 2 is disposed between the energy storage devices 10 arranged in the X axis direction or between the energy storage device 10 and a member disposed adjacently to the energy storage device 10 in the X axis direction (in an example of this embodiment, a portion of the holder 4). The neighboring members 2 include plural kinds of neighboring members. In this embodiment, the neighboring members 2 include: a first neighboring member 21 which is disposed adjacently to the energy storage devices 10 disposed at an intermediate position in the X axis direction; second neighboring members 22 which are disposed adjacently to and outside the energy storage devices 10 disposed at outermost ends of the energy storage apparatus 1 in the X axis direction respectively; and third neighboring members 23 each of which is disposed adjacently to the energy storage devices 10 disposed between the partition portion 21 and the second neighboring member 22 in the X axis direction.

The partition portion 21 has insulation property and is disposed between the energy storage devices 10 whose external terminals 14 are connected to each other by the bus bars 8. With such a configuration, a predetermined distance (creepage distance or the like) can be ensured between the energy storage devices 10 which are arranged in the X axis direction with the partition portion 21 interposed therebetween. The first neighboring member 21 is connected (fixed) to the holder 4.

To be more specific, the first neighboring member 21 includes a plate-like first body portion 211 which is disposed between the energy storage devices 10 disposed adjacently to each other, and first restricting portions 212 which restrict the movement of the energy storage devices 10 disposed adjacently to the first body portion 211 with respect to the first body portion 211. The first neighboring member 21 also includes engaging portions 213 which are engaged with the holder 4.

The first body portion 211 is a portion which opposedly faces enlarged width surfaces of the cases 13 of the energy storage devices 10 and expands in a Y-Z plane (a plane including the Y axis and the Z axis) direction. The first body portion 211 of this embodiment forms flow passages which allow a temperature adjusting fluid (air in this embodiment) to pass therethrough between the first body portion 211 and the energy storage devices 10 disposed adjacently to the first body portion 211. Further, the first body portion 211 includes a connecting portion 211A to which the holder 4 is fixed (connected) on both ends in the Y axis direction respectively. A size (a thickness) of the first body portion 211 in the X axis direction of this embodiment is larger than sizes (thicknesses) in the X axis direction of respective portions of the second neighboring members 22 and the third neighboring members 23 which correspond to the first body portion 211. A size of the first body portion 211 in the X axis direction in this embodiment is set equal to or more than a size of a fusible portion 81A of the first bus bar 8A described later in the X axis direction.

Bolts B are threadedly engaged with the connecting portions 211A, in a state where the bolts B penetrate the holder 4. In the energy storage apparatus 1, due to the threaded engagement of the bolts B with the connecting portions 211A, the first body portion 211 (first neighboring member 21) and the holder 4 are connected to each other. The connecting portions 211A of this embodiment respectively include a nut which is embedded in end portions of the first body portions 211 in the Y axis direction.

The first restricting portions 212 extend in the X axis direction from the first body portion 211, and are brought into contact with the energy storage devices 10 (specifically, the cases 13) disposed adjacently to the first body portion 211 from an outer side in a Y-Z plane direction thus restricting the relative movement of the energy storage device 10 in the Y-Z plane direction with respect to the first body portion 211. The first restricting portions 212 of this embodiment extend toward both sides in the X axis direction from the first body portion 211 respectively.

The engaging portions 213 extend outward from ends of the first body portion 211 in the Y axis direction, and are engaged with the holder 4. The engaging portions 213 of this embodiment are shaft-like portions extending outward from both ends of the first body portion 211 in the Y axis direction respectively. The engaging portions 213 are made to pass through through holes 421B formed in portions of the holder 4 corresponding to the engaging portion 213 and are engaged with the holder 4.

The second neighboring member 22 has insulation property, and is disposed between the energy storage device 10 and the holder 4 (end member 41) in the X axis direction thus ensuring a distance (creepage distance or the like) between the energy storage device 10 and the holder 4 (end member 41). To be more specific, the second neighboring member 22 includes a second body portion 221 which is disposed adjacently to the energy storage device 10 between the energy storage device 10 and the holder 4, and second restricting portions 222 which restrict the movement of the energy storage device 10 with respect to the second body portion 221.

The second body portions 221 are portions which opposedly face enlarged width surfaces of the cases 13 of the energy storage devices 10 which are disposed on end portions in the X axis direction out of the plurality of energy storage devices 10, and expand in the Y-Z plane direction. In this embodiment, flow passages which allow a temperature adjusting fluid (air in this embodiment) to pass therethrough are formed between each second body portion 221 and the energy storage device 10 disposed adjacently to the second body portion 221.

The second restricting portions 222 extend in the X axis direction from the second body portion 221, and are brought into contact with the energy storage device 10 (specifically, the case 13) disposed adjacently to the second body portion 221 from an outer side in the Y-Z plane direction thus restricting the relative movement of the energy storage device 10 in the Y-Z plane direction with respect to the second body portion 221.

The third neighboring member 23 has an insulation property. The third neighboring member 23 is disposed between the energy storage devices 10 disposed adjacently to each other between the first neighboring member 21 and the second neighboring member 22 thus ensuring a distance (creepage distance or the like) between the energy storage devices 10. To be more specific, the third neighboring member 23 includes a third body portion 231 which is disposed adjacently to the energy storage devices 10 (case bodies 131), and third restricting portions 232 which restrict the movement of the energy storage devices 10 with respect to the third body portion 231.

The third body portion 231 is a portion which opposedly faces enlarged width surfaces of the cases 13 of the energy storage devices 10, and expands in the Y-Z plane direction. In this embodiment, flow passages which allow a temperature adjusting fluid (air in this embodiment) to pass therethrough are formed between the third body portion 231 and the energy storage devices 10 disposed adjacently to the third body portion 231.

The third restricting portions 232 extend in the X axis direction from the third body portion 231, and are brought into contact with the energy storage devices 10 (specifically, the cases 13) disposed adjacently to the third body portion 231 from an outer side in the Y-Z plane direction thus restricting the relative movement of the energy storage devices 10 in the Y-Z plane direction with respect to the third body portion 231 of the energy storage device 10.

The holder 4 surrounds the periphery of the plurality of energy storage devices 10 and the plurality of neighboring members 2 thus collectively holding the plurality of energy storage devices 10 and the plurality of neighboring members 2. The holder 4 is made of a material having conductivity such as metal. To be more specific, the holder 4 includes: a pair of end members (end portions) 41 disposed on both sides of a unit formed of the plurality of energy storage devices 10 in the X axis direction, and connecting members 42 which connect the pair of end members 41 to each other.

Each of the pair of end members 41 is disposed so as to sandwich the second neighboring member 22 between the end member 41 and the energy storage device 10 disposed on an end of the energy storage apparatus 1 in the X axis direction out of the plurality of energy storage devices 10. The end member 41 expands in the Y-Z plane direction. To be more specific, the end member 41 includes a body 411 having a profile corresponding to the energy storage device 10 (in this embodiment, a rectangular profile), and a pressure contact portion 412 which projects from the body 411 toward the second neighboring member 22 (second body portion 221) and is brought into contact with the second neighboring member 22 thus pressing the second neighboring member 22.

The pair of connecting members 42 is disposed on both sides of the plurality of energy storage devices 10 in the Y axis direction. Each of the pair of connecting members 42 includes a pair of beam portions 420 which extends in the X axis direction and is disposed in a spaced apart manner in the Z axis direction, a first connecting portion 421 which connects the pair of beam portions 420 to each other at an intermediate position in the X axis direction (in this embodiment, at a position overlapping with the first neighboring member 21 as viewed in the Y axis direction), and a pair of second connecting portions 422 which connects end portions of the pair of beam portions 420. The connecting member 42 also includes third connecting portions 423 which connect the pair of beam portions 420 to each other between the first connecting portion 421 and the second connecting portions 422. In this embodiment, the connecting member 42 includes the plurality of third connecting portions 423.

Each of the pair of beam portions 420 extends along respective corner portions of the plurality of energy storage devices 10 (cases 13) arranged in the X axis direction. The first connecting portion 421 extends in the Z axis direction, and has through holes 421A, 421B at positions corresponding to the connecting portions 211A and the engaging portions 213 of the first neighboring member 21 (to be more specific, at positions overlapping with the connecting portions 211A and the engaging portions 213 as viewed in the Y axis direction). The bolts B are inserted into the through holes 421A, and the bolts B are threadedly engaged with the connecting portions 211A of the first neighboring member 21. With such a configuration, the connecting member 42 and the first neighboring member 21 are connected to each other. In the through holes 421B, the engaging portions 213 of the first neighboring member 21 are inserted. The second connecting portions 422 extend in the Z axis direction, and are connected to the end members 41. With such a configuration, the end members 41 and the connecting members 42 are connected (joined) to each other. The third connecting portions 423 extend in the Z axis direction at positions overlapping with the energy storage devices 10 as viewed in the Y axis direction.

The insulators 6 have insulation property. Each insulator 6 is disposed between the connecting member 42 and the plurality of energy storage devices 10. To be more specific, the insulator 6 covers at least regions of the connecting member 42 which opposedly faces the plurality of energy storage devices 10. With such a configuration, the insulators 6 provide insulation between the connecting members 42 and the plurality of energy storage devices 10.

The bus bars 8 are respectively formed of a plate-like member made of metal or the like having conductivity. The bus bar 8 makes the external terminals 14 of the energy storage devices 10 conductive with each other. The bus bars 8 are formed of a plurality of bus bars (the number of bus bars corresponding to the number of the plurality of energy storage devices 10) in the energy storage apparatus 1. The plurality of bus bars 8 of this embodiment connect all the plurality of energy storage devices 10 included in the energy storage apparatus 1 with each other (make all the plurality of energy storage devices 10 conductive with each other) in series. The bus bars 8 include: the first bus bars 8A each of which connects the external terminals 14 of the energy storage devices 10 which are disposed adjacently to each other with the first neighboring member 21 interposed (sandwiched) therebetween to each other; and second bus bars 8B each of which connects the external terminals 14 of the energy storage devices 10 disposed adjacently to each other with the third neighboring member 23 interposed (sandwiched) therebetween to each other.

The first bus bar 8A includes a plate-like conductive portion which connects the external terminals 14 of the different energy storage devices 10 to each other in a conductive manner. In this embodiment, the first bus bar 8A is formed of only a conductive portion, and both ends of the first bus bar 8A in the X axis direction are welded to the external terminals 14 respectively. With such a configuration, the external terminals 14 of the energy storage devices 10 disposed adjacently to each other with the first neighboring member 21 interposed therebetween are made conductive with each other.

Figure 7:
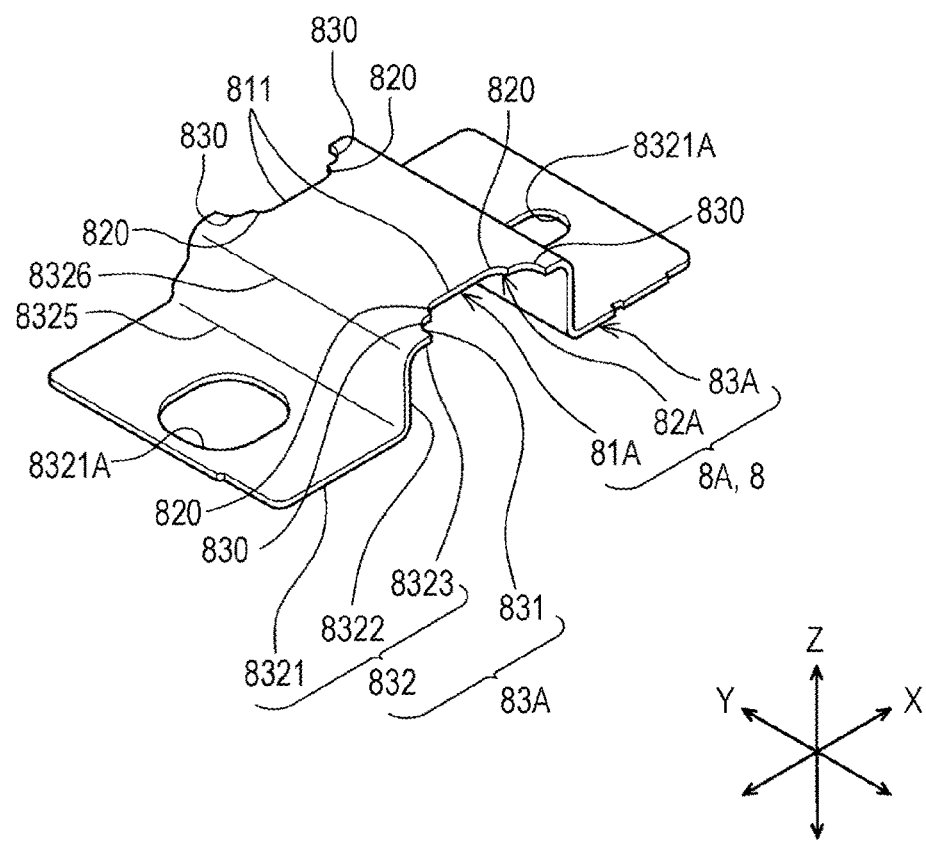
FIG. 7 is a perspective view of a first bus bar.
Figure 8:
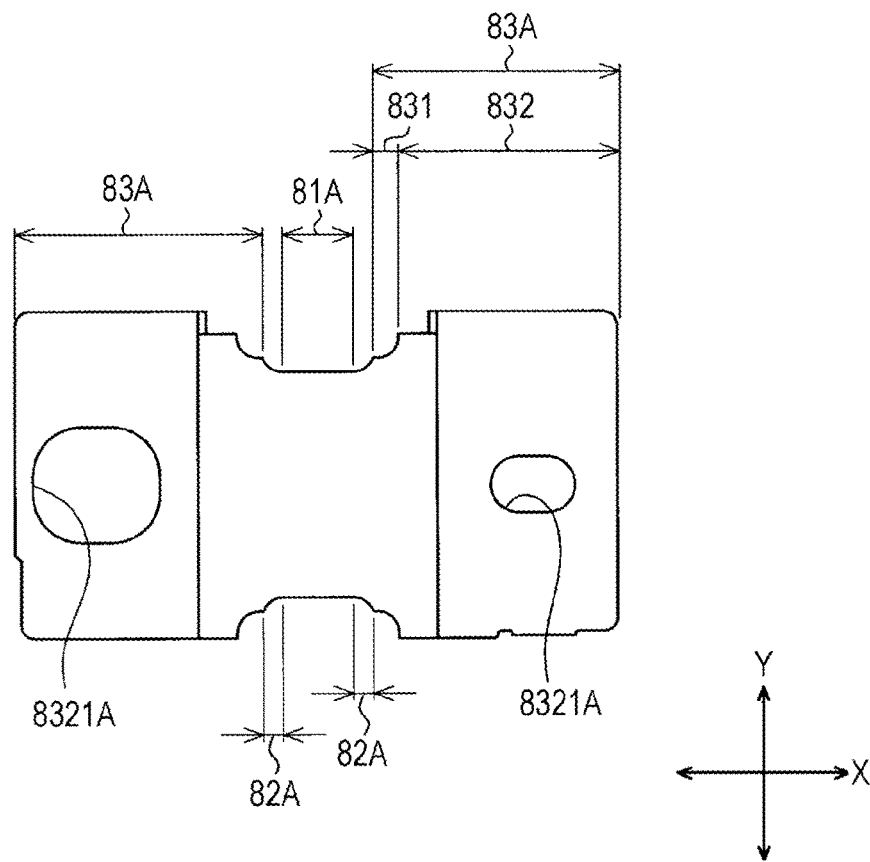
FIG. 8 is a view of the first bus bar as viewed in a Z axis direction.
Figure 9:
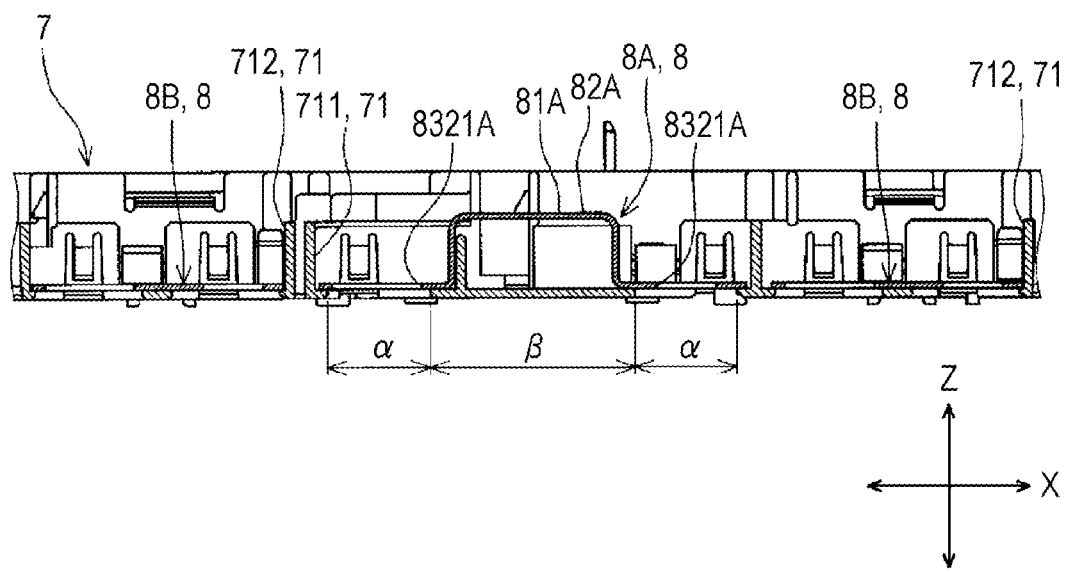
FIG. 9 is a partially enlarged cross-sectional view taken along a position IX-IX in FIG. 2.

To be more specific, as shown also in FIG. 7 and FIG. 8, the first bus bar 8A includes; a fusible portion 81A which is fused when an overcurrent flows in the energy storage apparatus 1; and a pair of enlarged width portions 82A which defines a range of the fusible portion 81A in the first bus bar 8A (that is, a portion which is fused when an overcurrent flows in the energy storage apparatus 1). In this embodiment, the first bus bar 8A includes a pair of stress relaxing portions 83A. The stress relaxing portions 83A suppress (relax) a stress which is generated in the first bus bar 8A when a change occurs in distance, a relative position or the like due to vibrations, acceleration or the like between the energy storage devices 10 whose external terminals 14 are connected to each other.

The fusible portion 81A is a rectangular-shaped portion disposed at a center portion of the first bus bar 8A in the X axis direction. The fusible portion 81A includes a pair of edges 811 on both ends in the Y axis direction. The respective edges 811 extend in a straight line shape in the X axis direction. That is, the pair of edges 811 extends parallel to each other. A size (width size) of the fusible portion 81A in the Y axis direction is defined by the pair of edges 811. A width size of the fusible portion 81A is smaller than width sizes of other portions (in this embodiment, the enlarged with portions 82A and the stress relaxing portions 83A) of the first bus bar 8A. By setting the width size of the fusible portion 81A smaller than the width sizes of other portions (the enlarged width portions 82A, the stress relaxing portions 83A) of the first bus bar 8A, the fusible portion 81A is fused earlier than other portions when an overcurrent flows in the energy storage apparatus 1.

Sizes (a width size, a length size in the X axis direction and the like) of the fusible portion 81A are set based on a current value necessary for fusing the fusible portion 81A. In this embodiment, a current value with which the fusible portion 81A is fused is smaller than a current value with which the current collector 15 is fused.

To be more specific, the larger a length size of the fusible portion 81A, the more difficult for heat generated in the fusible portion 81A to leak to the portions disposed adjacently to the fusible portion 81A and having the larger width size (cross-sectional area) than the fusible portion 81A such as the enlarged width portion 82A and the stress relaxing portion 83A (That is, the closer a portion where heat is generated to a center portion side in the length direction (X axis direction), the more difficult for the heat to leak). Accordingly, in such a case, the fusible portion 81A is fused with a smaller current value.

Alternatively, the smaller a cross-sectional area (an area of a cross section orthogonal to a direction that an electric current flows) of the fusible portion 81A, the more difficult for heat generated in the fusible portion 81A to leak to the portions disposed adjacently to the fusible portion 81A and having a larger cross-sectional area than the fusible portion 81A. Accordingly, in such a case, the fusible portion 81A is fused with a smaller current value. The respective sizes of the fusible portion 81A are set by taking into account the above-mentioned points and the like. However, by forming the pair of edges 811 in a straight shape (that is, by setting cross-sectional areas at respective positions equal in the X axis direction), the sizes of the fusible portion 81A can be easily set in conformity with a current value at which the fusible portion 81A is fused.

The pair of enlarged width portions 82A is contiguously formed with both sides of the fusible portion 81A in the X axis direction (predetermined direction). A width size of each of the pair of enlarged width portions 82A is increased in a direction away from the fusible portion 81A (to be more specific, away from the fusible portion 81A in the X axis direction). In this manner, by forming the portions having a larger width size than the fusible portion 81A (that is, the portions having a larger cross-sectional area) on both sides of the fusible portion 81A in the X axis direction, a temperature of the fusible portion 81A can be set higher than temperatures of other portions such as the enlarged width portions 82A when heat is generated by the flow of an electric current through the first bus bar 8A. With such a configuration, it is possible to restrict a portion (range) which is fused when a large current flows in the first bus bar 8A. In this embodiment, the edges 820 of the enlarged width portion 82A in the Y axis direction have an arcuate shape.

The pair of stress relaxing portions 83A is contiguously formed with outer sides of the pair of enlarged width portions 82A in the X axis direction respectively. In this embodiment, the stress relaxing portion 83A includes: a first portion 831 which relaxes (suppresses) stress concentration due to a shape of an edge in the Y axis direction; and a second portion 832 which relaxes (suppresses) stress concentration due to elastic deformation.

The first portion 831 is a portion extending from the enlarged width portion 82A toward the outside in the X axis direction. A width size of the first portion 831 is increased in a direction away from the enlarged width portion 82A (to be more specific, in a direction away from the enlarged width portion 82A in the X axis direction). In the first bus bar 8A, when a width size is sharply decreased to the fusible portion 81A only through the enlarged width portion 82A, a stress is liable to concentrate on this portion. By gradually decreasing the width side of the first bus bar 8A to the fusible portion 81A by way of the first portion 831 and the enlarged width portion 82A by providing the first portion 831 (stress relaxing portion 83A), it is possible to relax (suppress) stress concentration on the portion of the first bus bar 8A.

In this embodiment, the edge 830 of the first portion 831 in the Y axis direction has an arcuate shape. An edge of the first bus bar 8A in the Y axis direction is bent at a boundary position between the first portion 831 and the stress relaxing portion 83A (see FIG. 8).

The second portion 832 includes: a fixedly mounted portion (fixed portion) 8321 which is fixedly mounted on the external terminal 14; a raised portion 8322 which is raised from the fixedly mounted portion 8321; and an extending portion 8323 which extends from the raised portion 8322 to the first portion 831.

The fixedly mounted portion 8321 expands in the X-Y plane (plane including the X axis and the Y axis) direction, and a hole 8321A is formed at a center portion of the fixedly mounted portion 8321. A peripheral portion of the hole 8321A is welded to the external terminal 14 so that the fixedly mounted portion 8321 is fixedly mounted on the external terminal 14.

The raised portion 8322 extends from an end portion of the fixedly mounted portion 8321 on a fusible portion 81A side in the Z axis direction (to be more specific, expanding in the Y-Z plane direction). A boundary portion between the fixedly mounted portion 8321 and the raised portion 8322 forms a first bent portion 8325.

The extending portion 8323 extends from a distal end of the raised portion 8322 in the X axis direction (to be more specific, expanding in the X-Y plane direction). A boundary portion between the raised portion 8322 and the extending portion 8323 forms a second bent portion 8326.

In the second portion 832, the first bent portion 8325 and the second bent portion 8326 are elastically deformed, that is, the degree of bending (bending angle) of the first bent portion 8325 and the degree of bending (bending angle) of the second bent portion 8326 are changed and hence, stress concentration on the first bus bar 8A can be relaxed. That is, the generation of stress concentration can be suppressed.

Figure 3:
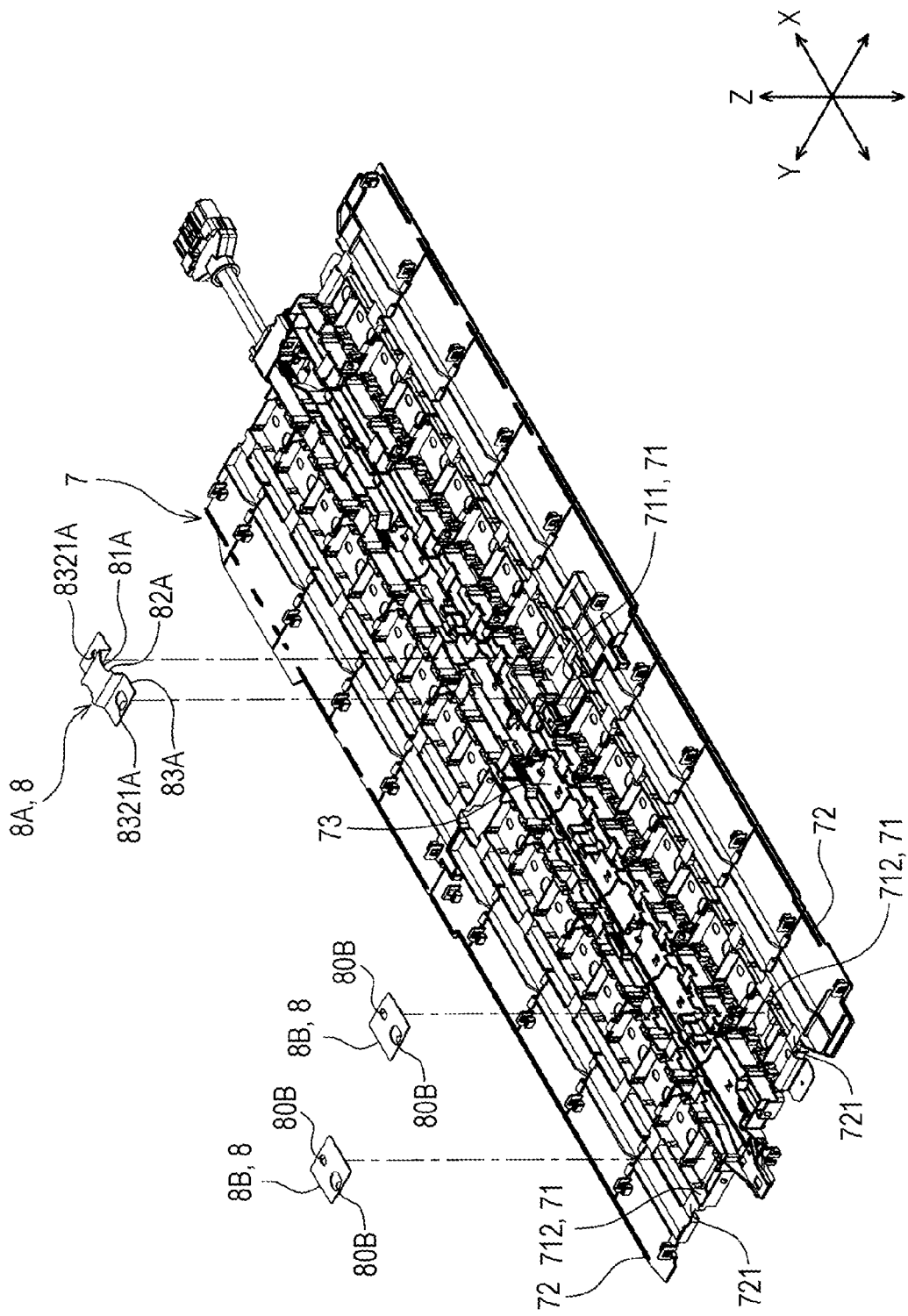
FIG. 3 is a perspective view of the cover member in a state where the cover member holds the bus bars.

As shown in FIG. 3, the second bus bar 8B has a rectangular plate shape. A hole 80B is formed on both ends of the second bus bar 8B in the X axis direction respectively. Since peripheral portions of the holes 80B are respectively welded to the external terminals 14 and hence, the second bus bar 8B is fixedly mounted on the external terminals 14. With such a configuration, the external terminals 14 of the energy storage devices 10 disposed adjacently to each other with the third neighboring member 23 interposed therebetween are made conductive with each other.

As shown in FIG. 1 to FIG. 3, the cover member 7 is a member which overlaps with the plurality of energy storage devices 10 as viewed in the Z axis direction (that is, covering the plurality of energy storage devices 10 from one side in the Z axis direction). In this embodiment, the cover member 7 is made of a resin, and has an approximately rectangular shape as viewed in the Z axis direction.

To be more specific, the cover member 7 has: a plurality of partition portions 71 each of which surrounds a periphery of each bus bar 8; a plurality of lid portions 72 which close openings of the partition portions 71 respectively; and a wiring portion 73 where electric wires and the like are disposed. In the cover member 7 of this embodiment, the partition portions 71 arranged in the X axis direction are arranged in two rows in a spaced apart manner in the Y axis direction.

Each of the plurality of partition portions 71 surrounds the periphery of the bus bar 8 (to be more specific, surrounding the bus bar 8 and two external terminals 14 to which the bus bar 8 is connected from the outside in the X-Y plane direction) thus holding the bus bar 8. In this embodiment, the partition portions 71 include first partition portions 711 each of which surrounds the first bus bar 8A, and second partition portions 712 each of which surrounds the second bus bar 8B.

The first partition portion 711 has an angular cylindrical shape surrounding the first bus bar 8A. As shown in FIG. 1 to FIG. 3 and FIG. 9, at an end portion of the first partition portion 711 on an energy storage device 10 side, regions overlapping with the external terminals 14 as viewed in the Z axis direction (portions: regions indicated by symbol α in FIG. 9) are opened, and the other region (a position overlapping with the fusible portion 81A and the enlarged width portions 82A of the first bus bar 8A as viewed in the Z axis direction: a region indicated by symbol β in FIG. 9) is closed. At an end portion of the first partition portion 711 on a side opposite to the energy storage device 10, the whole region surrounded by the first partition portion 711 is opened.

The second partition portion 712 has an angular cylindrical shape surrounding the second bus bar 8B. At an end portion of the second partition portion 712 on an energy storage device 10 side, similar to the first partition portion 711, a region overlapping with the external terminal 14 as viewed in the Z axis direction is opened, and the other region is closed. Further, at an end portion of the second partition portion 712 on a side opposite to the energy storage device 10, in the same manner as the first partition portion 711, the whole region surrounded by the second partition portion 712 is opened.

In the cover member 7, this plurality of partition portions 71 are arranged in the X axis direction thus forming rows of the partition portions 71, and the rows of the partition portions 71 is arranged in two in a spaced apart manner in the Y axis direction.

Each of the plurality of lid portions 72 is a plate-like portion, and is connected to the partition portion 71 by way of a bendable portion 721. By bending the portion 721, the opening on the end portion of the partition portion 71 on a side opposite to the energy storage device 10 is closed. With such a configuration, the periphery of the bus bar 8 is surrounded by the partition portion 71 and the lid portion 72. In the cover member 7 of this embodiment, one lid portion 72 closes the openings of two partition portions 71 arranged in the X axis direction.

The wiring portion 73 is disposed between the rows of the partition portions 71, and is used as a wiring space for electric wires and the like. In the wiring portion 73 of this embodiment, electric wires connected to thermistors disposed between the cover members 7 and the lid plate 132 of the energy storage device 10 for measuring temperatures of the respective energy storage devices 10 and the like are disposed.

As in the case of the first bus bar 8A of the energy storage apparatus 1 having the above-mentioned configuration, by forming the enlarged width portions 82A whose width is gradually increased on both sides of the portion (fusible portion) 81A having the pair of edges 811, heat generated in the fusible portion 81A is liable to be accumulated in the fusible portion 81A. Further, when heat is transferred to the enlarged width portions 82A, heat is diffused rapidly (heat being easily leaked). Accordingly, when heat is generated in the first bus bar (conductive portion) 8A, heat is accumulated in the fusible portion 81A so that a temperature of the fusible portion 81A is sufficiently increased. Conversely, a temperature of the enlarged width portion 82A is sufficiently low compared to a temperature of the fusible portion 81A. Accordingly, when a temperature of the first bus bar 8A is increased with the flowing of an overcurrent, the fusible portion 81A which becomes a high temperature is quickly fused so that a path in the energy storage apparatus 1 through which an overcurrent flows is rapidly interrupted. As a result, the increase of a temperature of the external terminal 14 caused by the overcurrent can be suitably suppressed.

When an overcurrent flows in the first bus bar 8A, the fusible portion 81A may be melted or be softened by heat so that the fusible portion 81A sags. Accordingly, when the energy storage device 10 is disposed below the fusible portion 81A, there exists a possibility that the melted first bus bar 8A (fusible portion 81A) or the first bus bar 8A which sags falls on the energy storage device 10 or is brought into contact with the energy storage device 10 so that the energy storage device 10 is damaged.

However, in the energy storage apparatus 1 of this embodiment, the fusible portion 81A is disposed at the position overlapping with the first neighboring member 21 as viewed in the Z axis direction, and the size of the first neighboring member 21 in the X axis direction is set larger than the size of the fusible portion 81A in the X axis direction. Accordingly, even when an overcurrent flows in the energy storage apparatus 1 in a state where the energy storage apparatus 1 is disposed such that the first bus bar 8A is positioned above the first neighboring member 21, and the fusible portion 81A is fused or the fusible portion 81A is softened by the increase of temperature so that the fusible portion 81A sags, it is possible to prevent the melted first bus bar 8A (fusible portion 81A) or the sagging first bus bar 8A from falling on the energy storage device 10 or from being brought into contact with the energy storage device 10.

In the energy storage apparatus 1 of this embodiment, the pair of edges of the first bus bar 8A in the width direction are bent at a boundary position between the enlarged width portion 82A and the stress relaxing portion 83A respectively. In this manner, by providing the enlarged width portions 82A and the stress relaxing portions 83A between the portions of the first bus bar 8A to be fixed to the external terminal 14 and the fusible portion 81A and by decreasing the width size of the first bus bar 8A to the fusing portion 81A by way of the stress relaxing portions 83A and the enlarged width portions 82A (by gradually decreasing the width size), compared to a case where only the enlarged width portion 82A is provided between the portions to be fixed to the external terminal 14 and the fusible portion 81A and the width size of the first bus bar 8A is sharply decreased to the fusible portion 81A only by way of the enlarged width portion 82A, it is possible to suppress stress concentration between the portions to be fixed to the external terminal 14 and the fusible portion 81A of the first bus bar 8A. That is, when the width size is sharply decreased (the width size being decreased within a narrow range in the X axis direction), stress concentration is liable to be increased. However, by forming the bent portions, a region (portion) where a rate that a width size is decreased is reduced is partially provided so that stress concentration can be suppressed.

Further, by bending the pair of edges of the first bus bar 8A at boundary positions between the stress relaxing portions 83A and the enlarged width portions 82A, that is, by changing a degree of width enlargement, the transfer of heat (degree of leakage of heat) from the fusible portion 81A toward the above-mentioned fixing portion or magnitudes of stresses at respective positions (distribution of stress) can be easily adjusted. That is, by setting the enlargement of width with consideration for the diffusion (easiness of leakage) of heat at the enlarged width portions 82A and the prevention of stress concentration at the stress relaxing portions 83A (to be more specific, first portions 831), a degree of leakage of heat and the distribution of stress can be easily adjusted.

In the energy storage apparatus 1 of this embodiment, the pair of respective edges of the fusible portion 81A extend in a straight line shape in the X axis direction. In this manner, when the pair of respective edges of the fusible portion 81A straightly extends in the X axis direction (that is, the edges extending parallel to each other), compared to a fusible portion (bus bar) where a width size is increased in a direction toward both outsides from a center portion in the X axis direction, heat generated at the center portion of the fusible portion 81A in the X axis direction minimally leaks to enlarged width portion 82A sides and hence, heat is liable to be accumulated in the fusible portion 81A. Accordingly, when an overcurrent flows in the first bus bar 8A, the fusible portion 81A is fused more quickly. This operation is described in detail hereinafter.

Since the width size of the fusible portion 81A at respective positions in the X axis direction is fixed, that is, the pair of edges 811 of the fusible portion 81A extends in a straight line shape in the X axis direction and parallel to each other. Accordingly, compared to a fusible portion (bus bar) where a width size is increased in a direction toward outsides from a center portion in the X axis direction, heat generated at the center portion of the fusible portion 81A in the X axis direction minimally leaks to enlarged width portion 82A sides. Accordingly, when an overcurrent flows in the first bus bar 8A and heat is generated in the fusible portion 81A, the heat is accumulated in the fusible portion 81A so that a temperature of the fusible portion 81A is liable to be increased. As a result, when an overcurrent flows in the first bus bar 8A, the fusible portion 81A is fused quickly so that a path through which the overcurrent flows is interrupted rapidly.

To the contrary, in the fusible portion where a width size is increased toward the outsides in the X axis direction, heat generated at the center portion of the fusible portion in the X axis direction leaks to the outsides in the X axis direction more easily compared to the fusible portion 81A of this embodiment and hence, a timing at which the fusible portion is fused when an overcurrent flows in the fusible portion is delayed compared to the fusible portion 81A of this embodiment. Accordingly, an interruption of a path through which the overcurrent flows is delayed. As a result, a temperature of the external terminal of the energy storage device to which the bus bar is connected is easily increased.

Further, by providing the enlarged width portion 82A where heat is easily leaked on both sides of the fusible portion 81A, as described above, a temperature of the enlarged width portions 82A is sufficiently low compared to a temperature of the fusible portion 81A and hence, a fusible range can be limited to the fusible portion 81A. With such a configuration, when an overcurrent flows in the first bus bar 8A, a region where melted metal (metal which formed the first bus bar 8A) falls can be easily estimated so that a countermeasure can be easily taken for preventing the energy storage device 10 from being damaged by the melted and fallen metal.

In the energy storage apparatus 1 of this embodiment, the periphery of the bus bar 8 is surrounded by the cover member 7 (to be more specific, the partition portion 71 and the lid portion 72). Accordingly, it is possible to prevent the melted first bus bar 8A (fusible portion 81A) from falling on the energy storage device 10 with more certainty.

In the energy storage apparatus 1 of this embodiment, the length size and the width size of the fusible portion 81A of the first bus bar 8A are set to sizes such that, when an overcurrent flows in the energy storage apparatus 1, the fusible portion 81A is fused earlier than the current collector 15. To consider a case where the current collector 15 is fused, the energy storage device 10 cannot be used. Accordingly, as in the case of the energy storage apparatus 1 of this embodiment, in a situation where an overcurrent flows in the energy storage apparatus 1 so that temperatures of respective portions (respective portions on the flow path through which an electric current flows) of the energy storage apparatus 1 are increased, the bus bar (first bus bar 8A) is fused earlier than the current collector 15 so that the current flow path interrupted whereby fusing of the current collector 15, that is, a damage to the energy storage device 10 per se can be prevented.

Figure 10:
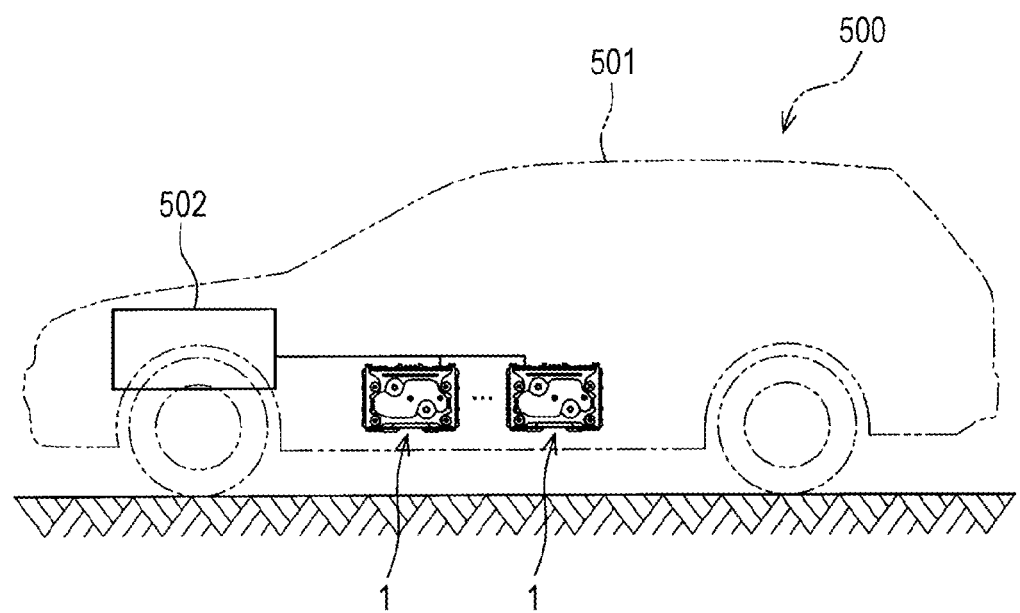
FIG. 10 is a schematic view for describing a movable object according to a second embodiment.

Next, a second embodiment of the present invention is described with reference to FIG. 10. In the second embodiment, constitutional elements substantially equal to the constitutional elements in the first embodiment are given the same symbols, and the detailed description of the constitutional elements is not repeated, and only the constitutional elements different form the constitutional elements of the first embodiment are described in detail. The second embodiment of the present invention relates to a movable object.

A movable object 500 includes: energy storage apparatuses 1, a movable object body 501 on which the energy storage apparatuses 1 are mounted; and a drive part which drives the movable object body 501 using electricity supplied from the energy storage apparatuses 1. The movable object 500 of this embodiment is an automobile, the movable object body 501 is a vehicle body, and the drive part 502 is a motor. The movable object 500 is not limited to an automobile, and may be an aircraft, a boat, a ship, a train, construction equipment or the like. That is, the movable object 500 is not limited to an automobile, and may be any object provided that the object moves (travels or the like) by using electricity supplied from the energy storage apparatuses 1.

In the movable object 500, the energy storage apparatuses 1 are disposed such that a first neighboring member 21 is positioned below a fusible portion 81A of a first bus bar 8A. In an example shown in FIG. 10, the energy storage apparatus 1 is disposed in a posture that the first neighboring member 21 is positioned directly below the fusible portion 81A of the first bus bar 8A. The energy storage apparatus 1 may be disposed in an inclined manner with respect to the posture shown in FIG. 10 within a range where the first bus bar 8A which is melted by an overcurrent is brought into contact with the first neighboring member 21 or a sagging first bus bar 8A caused by an overcurrent is brought into contact with the first neighboring member 21 (in other words, within a range where the first bus bar 8A which is melted by an overcurrent or the sagging first bus bar 8A caused by an overcurrent does not impinge on or is not brought into contact with the energy storage device 10 disposed adjacently to the first neighboring member 21).

In the movable object 500 of this embodiment, a plurality of energy storage apparatuses 1 are mounted on the movable object body 501 in the same posture.

According to the movable object 500 described above, in the energy storage apparatus 1 mounted on the movable object 500, when an overcurrent flows in the energy storage apparatus 1 so that a temperature of the first bus bar 8A is increased, the fusible portion 81A which becomes a high temperature is quickly fused so that a path in the energy storage apparatus 1 through which an overcurrent flows is rapidly interrupted. As a result, the increase of a temperature of the external terminal 14 caused by an overcurrent can be suitably suppressed.

Further, the energy storage apparatus 1 is disposed such that the first bus bar 8A is positioned on an upper side of (above) the first neighboring member 21 and hence, even when an overcurrent flows in the energy storage apparatus 1 so that the fusible portion 81A is fused, it is possible to prevent the melted first bus bar 8A (fusible portion 81A) from falling on the energy storage device 10 (to be more specific, on the energy storage devices 10 where the external terminals 14 are connected to each other by the first bus bar 8A) or to prevent the sagging first bus bar 8A from being brought into contact with the energy storage device 10.

Figure 11:
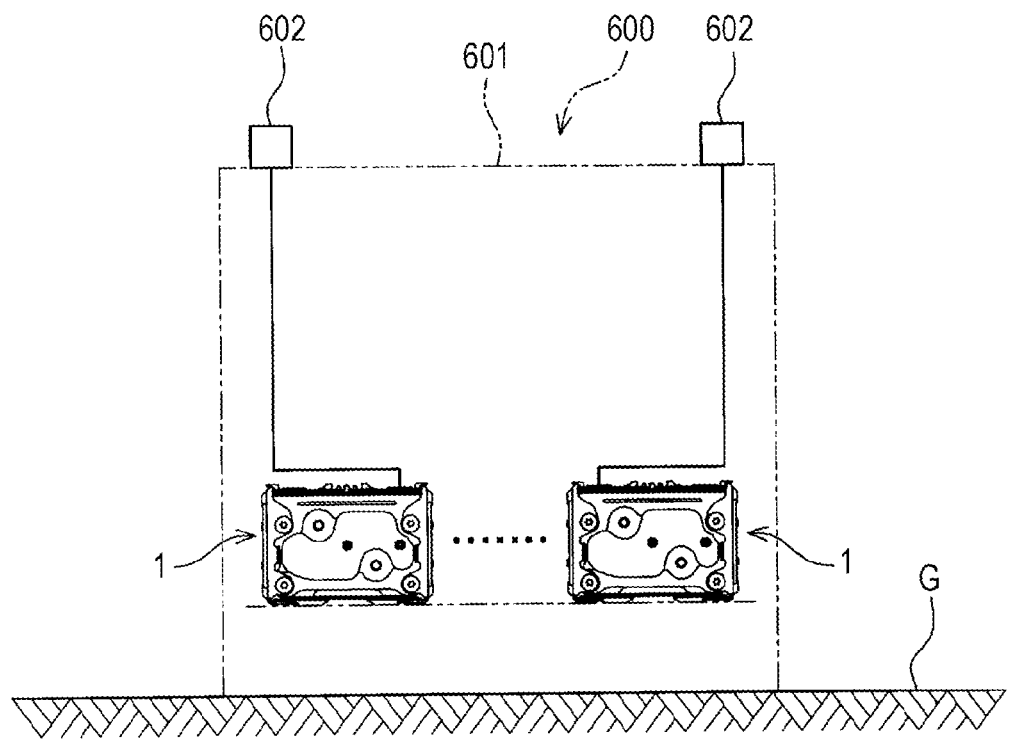
FIG. 11 is a schematic view for describing an energy storage system according to a third embodiment.
Figure 12:
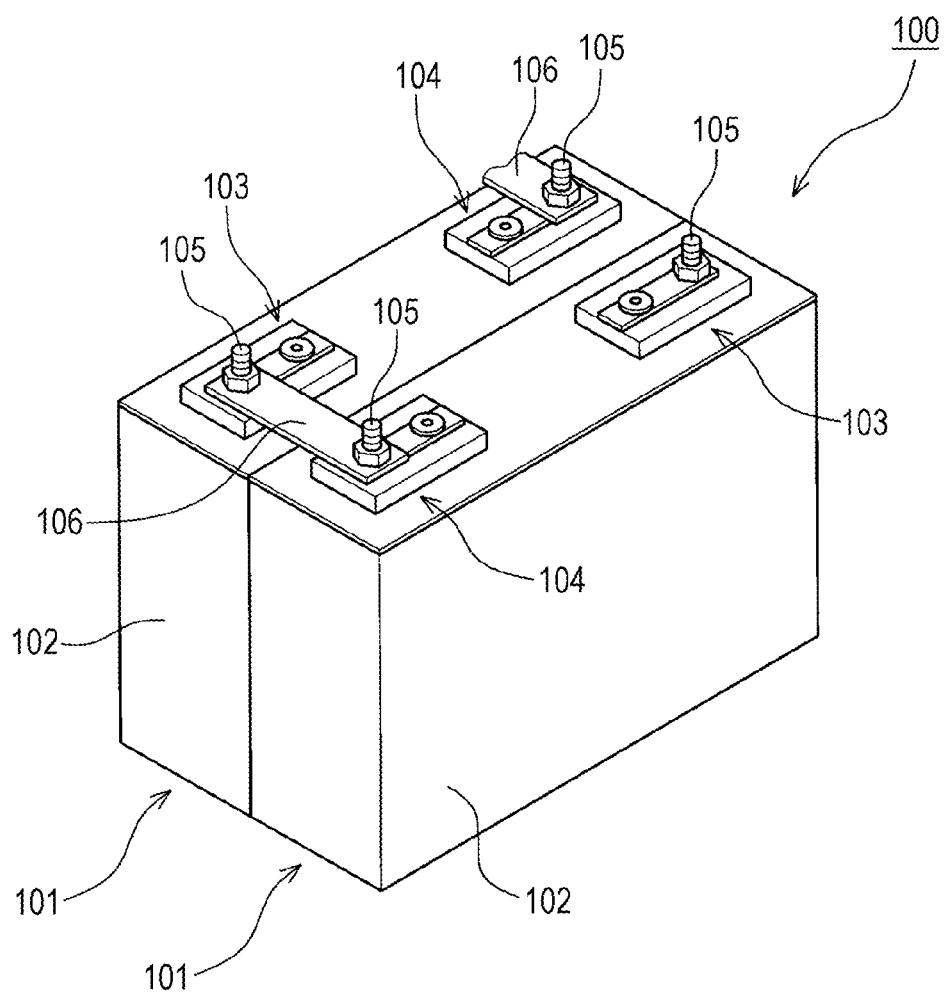
FIG. 12 is a view for describing a conventional energy storage module.

Next, a third embodiment of the present invention is described with reference to FIG. 11. In the third embodiment, constitutional elements substantially equal to the constitutional elements of the first embodiment are given the same symbols, and the detailed description of the constitutional elements is not repeated, and the detailed description is made only with respect to the different constitutional elements. The third embodiment of the present invention relates to an energy storage system.

An energy storage system 600 includes: energy storage apparatuses 1; an energy storage system body 601 on which the energy storage apparatuses 1 are mounted; and input and output terminals 602 which are connected to the energy storage apparatuses 1 (to be more specific, all terminals of the energy storage apparatuses 1) and allow inputting of electricity to the energy storage apparatuses 1 from the outside and outputting of electricity from the energy storage apparatuses 1 to the outside. The energy storage system 600 of this embodiment is used for wind power generation, solar power generation or the like. The energy storage system body 601 is a casing installed on an installation place G. The input and output terminals 602 are terminals connected to a power transmission system through which electricity is supplied to a windmill, a solar battery or the outside. The energy storage system 600 may not be limited to a system for storing electricity generated by a windmill or a solar battery, and may be a household-use system which stores inexpensive night-time generated electricity or a backup system which constantly stores a fixed amount of electricity required at the time of occurrence of a disaster.

In this energy storage system 600, the energy storage apparatus 1 is disposed such that a first neighboring member 21 is positioned below a fusible portion 81A of a first bus bar 8A. In an example shown in FIG. 11, the energy storage apparatus 1 is disposed in a posture that the first neighboring member 21 is positioned directly below the fusible portion 81A of the first bus bar 8A. The energy storage apparatus 1 may be disposed in an inclined manner with respect to the posture shown in FIG. 11 within a range where the first bus bar 8A which is melted by an overcurrent is brought into contact with the first neighboring member 21 or a sagging first bus bar 8A caused by an overcurrent is brought into contact with the first neighboring member 21 (in other words, within a range where the first bus bar 8A which is melted by an overcurrent or the sagging first bus bar 8A caused by an overcurrent does not impinge on or is not brought into contact with the energy storage device 10 disposed adjacently to the first neighboring member 21).

In the energy storage system 600 of this embodiment, the plurality of energy storage apparatuses 1 are mounted on the energy storage system body 601 in the same posture.

According to the energy storage system 600 described above, in the energy storage apparatus 1 mounted on the energy storage system 600, when an overcurrent flows in the energy storage apparatus 1 so that a temperature of the first bus bar 8A is increased, the fusible portion 81A which becomes a high temperature is quickly fused so that a path in the energy storage apparatus 1 through which an overcurrent flows is rapidly interrupted. As a result, the increase of a temperature of the external terminal 14 caused by an overcurrent can be suitably suppressed.

Further, the energy storage apparatus 1 is disposed such that the first bus bar 8A is positioned on an upper side of (above) the first neighboring member 21 and hence, even when an overcurrent flows in the energy storage apparatus 1 so that the fusible portion 81A is fused, it is possible to prevent the melted bus bar 8A (fusible portion 81A) from falling on the energy storage device 10 (to be more specific, on the energy storage devices 10 where the external terminals 14 are connected to each other by the first bus bar 8A) or to prevent the first bus bar 8A from sagging and being brought into contact with the energy storage device 10.

As a matter of course, the energy storage apparatus of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

Although the first bus bar 8A of the above-mentioned embodiment includes the stress relaxing portions 83A, the first bus bar 8A is not limited to such a configuration. The first bus bar 8A may not include the stress relaxing portion 83A. That is, it is sufficient for the first bus bar 8A to includes the fusible portion 81A and the enlarged width portion 82A.

Although the first bus bar 8A of the above-mentioned embodiment is formed of only the conductive portions (the fusible portion 81A, the enlarged width portions 82A, and the stress relaxing portions 83A in this embodiment), the first bus bar 8A may include portions other than the conductive portions.

In the above-mentioned embodiment, although the edge of the enlarged width portion 82A in the Y axis direction of the first bus bar 8A is formed into an arcuate shape, the present invention is not limited to such a configuration. The edge of the enlarged width portions 82A in the Y axis direction may be formed into a straight line shape. That is, the enlarged width portions 82A may be formed into a tapered shape as viewed in the Z axis direction.

In the above-mentioned embodiment, although the edge of the first portion 831 of the stress relaxing portion 83A of the first bus bar 8A in the Y axis direction has an arcuate shape, the present invention is not limited to such a configuration. The edge of the first portion 831 in the Y axis direction may be formed into a straight line shape. That is, the first portion 831 may be formed into a tapered shape as viewed in the Z axis direction.

When the enlarged width portion 82A and the first portion 831 are respectively formed into a tapered shape, an angle of the edge of the first portion 831 in the X axis direction is smaller than an angle of the edge of the enlarged width portion 82A in the X axis direction. This is because the smaller the angle of the edge of the first portion 831 with respect to the X axis direction, the more minimally stress concentration occurs in the first portion 831, and the larger the angle of the edge of the enlarged width portion 82A with respect to the X axis direction, the more easily heat generated in the fusible portion 81A is leaked.

In the first bus bar 8A of the above-mentioned embodiment, although the edge of the first portion 831 in the Y axis direction is formed into one arcuate shape, the present invention is not limited to such a configuration. The first bus bar 8A may be configured such that the edge of the first portion 831 in the Y axis direction is formed by contiguously forming a plurality of arcs having the same curvature or different curvatures, and the width size of the first portion 831 is increased in a direction away from the enlarged width portion 82A in the X axis direction. Also with such a configuration, stress concentration can be suppressed.

The stress relaxing portion 83A of the first bus bar 8A of the above-mentioned embodiment includes: the first portion 831 which suppresses stress concentration by the shape of the edge in the Y axis direction; and the second portion 832 which suppresses stress concentration due to elastic deformation. However, the present invention is not limited to such a configuration. The stress relaxing portion 83A may be formed of only the first portion 831.

In the energy storage apparatus 1 of the above-mentioned embodiment, although the first neighboring member 21 is disposed at the center position of the energy storage apparatus 1 in the X axis direction, the present invention is not limited to such a configuration. It is sufficient that the first neighboring member 21 be disposed at an intermediate position such as at a ⅓ position or at a ¼ position in the X axis direction of the energy storage apparatus 1. Further, the energy storage apparatus 1 may include a plurality of first neighboring members 21.

Although the energy storage apparatus 1 of the above-mentioned embodiment includes the cover member 7, the present invention is not limited to such a configuration. The energy storage apparatus 1 may not include the cover member 7.

Although the energy storage device 10 used in the energy storage apparatus 1 of the above-mentioned embodiment includes a so-called winding-type electrode assembly 12, the present invention is not limited to such a configuration. The energy storage device 10 may include a so-called stacking-type electrode assembly where sheet-shaped electrodes are stacked to each other, or an electrode assembly where at least one of a positive electrode or a negative electrode is formed in an elongated manner and is bent in a zigzag manner (being folded in a bellows shape).

What is claimed is:

1. An energy storage apparatus, comprising:
    a plurality of energy storage devices each including an external terminal, the plurality of energy storage devices being arranged in a first direction;
    a bus bar including a plate-like conductive portion which electrically connects external terminals of the plurality of energy storage devices with each other; and
    a neighboring member disposed between the plurality of energy storage devices where the external terminals are connected to each other by the bus bar,
    wherein the conductive portion includes:
        a fusible portion where a width size, which is a size in a second direction orthogonal to the first direction, is defined by a pair of edges, the width size being smaller than a width size of other portions of the conductive portion; and
        a pair of enlarged width portions contiguously formed with both sides of the fusible portion in the first direction, a width side of the pair of enlarged width portions gradually increasing in a direction away from the fusible portion,
    wherein the fusible portion is disposed at a position where the fusible portion overlaps with the neighboring member in a third direction orthogonal to the first direction and the second direction, and
    wherein, when viewed in the third direction, a size of a portion of the neighboring member in the first direction is equal to or more than a size of the fusible portion in the first direction, the portion of the neighboring member being disposed between the fusible portion and the plurality of energy storage devices of which the external terminals are connected with each other by the bus bar.

2. An energy storage apparatus according to claim 1, wherein the conductive portion further includes a pair of stress relaxing portions which is contiguously formed with outer sides of the pair of enlarged width portions in the first direction, and has a width size gradually increased in a direction away from the pair of enlarged width portions, and
    wherein a pair of edges of the conductive portion in a width direction is bent at a boundary position between the pair of enlarged width portions and the pair of stress relaxing portions.

3. The energy storage apparatus according to claim 1, further comprising a member which surrounds a periphery of the bus bar.

4. The energy storage apparatus according to claim 1, wherein the each of the plurality of energy storage devices includes an electrode assembly, and a current collector which connects the electrode assembly and the external terminal to each other, and
    wherein another size of the fusible portion in the first direction and the width size of the fusible portion in the second direction are set to sizes which allow fusing of the fusible portion earlier than the current collector when an overcurrent flows.

5. The energy storage apparatus according to claim 1, wherein respective edges of the pair of edges of the fusible portion extends in a straight line shape in the first direction.

6. A movable object, comprising:
    the energy storage apparatus according to claim 1;
    a movable object body on which the energy storage apparatus is mounted; and
    a drive part which drives the movable object body using electricity supplied from the energy storage apparatus,
    wherein the energy storage apparatus is disposed such that the neighboring member is positioned below the fusible portion of the bus bar.

7. An energy storage system, comprising:
    the energy storage apparatus according to claim 1;
    an energy storage system body on which the energy storage apparatus is mounted; and
    an input/output terminal connected to the energy storage apparatus and allowing inputting of electricity to the energy storage apparatus from an outside and outputting of electricity from the energy storage apparatus to the outside,
    wherein the energy storage apparatus is disposed such that the neighboring member is positioned below the fusible portion of the bus bar.

8. The energy storage apparatus according to claim 1, wherein each of the pair of edges of the fusible portion extends in a straight line in the first direction.

9. The energy storage apparatus according to claim 1, wherein, between the pair of enlarged width portions, each of the pair of edges of the fusible portion extends in a straight line in the first direction.

10. The energy storage apparatus according to claim 1, wherein the pair of edges of the fusible portion extends parallel to each other.

11. The energy storage apparatus according to claim 1, wherein the width size of the fusible portion remains constant as the pair of edges of the fusible portion extends in the first direction.

12. The energy storage apparatus according to claim 1, wherein, in the third direction, the portion of neighboring member overlaps with the fusible portion and the plurality of energy storage devices.

13. An energy storage apparatus, comprising:
    a plurality of energy storage devices each including an external terminal, the plurality of energy storage devices being arranged in a first direction;

a bus bar including a conductive portion which electrically connects external terminals of the plurality of energy storage devices with each other; and a neighboring member disposed between the plurality of energy storage devices where the external terminals are connected to each other by the bus bar, wherein the conductive portion includes:

a fusible portion where a width size, which is a size in a second direction orthogonal to the first direction, is defined by a pair of edges, the width size being less than a width size of other portions of the conductive portion; and a pair of enlarged width portions contiguously formed with first and second sides of the fusible portion in the first direction, a width side of the pair of enlarged width portions gradually increasing in a direction away from the fusible portion, wherein the fusible portion is disposed at a position where the fusible portion overlaps with the neighboring member, wherein a size of the neighboring member in the first direction is equal to or more than a size of the fusible portion in the first direction, and wherein the pair of edges of the fusible portion extends in a straight line in the first direction.

14. The energy storage apparatus according to claim 13, wherein each of the pair of edges of the fusible portion extends in the straight line in the first direction.

15. The energy storage apparatus according to claim 13, wherein, between the pair of enlarged width portions, each of the pair of edges of the fusible portion extends in a straight line in the first direction.

16. The energy storage apparatus according to claim 13, wherein the pair of edges of the fusible portion extends parallel to each other.

17. The energy storage apparatus according to claim 13, wherein the width size of the fusible portion remains constant as the pair of edges of the fusible portion extends in the first direction.

18. The energy storage apparatus according to claim 13, wherein, in a plan view, the neighboring member overlaps with the fusible portion and the plurality of energy storage devices.

19. The energy storage apparatus according to claim 13, wherein, in a third direction orthogonal to the first direction and the second direction, a portion of the neighboring member is disposed between the fusible portion and the plurality of energy storage devices.

20. The energy storage apparatus according to claim 19, wherein a size of the portion of the neighboring member in the first direction is equal to or more than a size of the fusible portion in the first direction.

* * * * *